United States Patent
Martin et al.

(10) Patent No.: US 8,270,012 B2
(45) Date of Patent: Sep. 18, 2012

(54) ECONOMIC MODEL FOR PRINTING WITH A PEER NETWORK OF PRINTING DEVICES

(75) Inventors: Nathaniel G. Martin, Rochester, NY (US); Hua Liu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1105 days.

(21) Appl. No.: 12/169,866

(22) Filed: Jul. 9, 2008

(65) Prior Publication Data

US 2010/0007910 A1    Jan. 14, 2010

(51) Int. Cl.
*G06F 3/12* (2006.01)
(52) U.S. Cl. .......................... 358/1.15; 358/1.1; 358/1.9
(58) Field of Classification Search .................... 358/1.1, 358/1.14, 1.15
See application file for complete search history.

(56) References Cited

U.S. PATENT DOCUMENTS

| | | | |
|---|---|---|---|
| 6,032,004 A | 2/2000 | Mirabella, Jr. et al. | |
| 6,502,147 B2 * | 12/2002 | Reilly | 710/104 |
| 2003/0033389 A1 * | 2/2003 | Simpson | 709/220 |
| 2005/0013626 A1 * | 1/2005 | Satoh et al. | 399/88 |
| 2005/0275852 A1 * | 12/2005 | Ferlitsch | 358/1.6 |
| 2006/0132826 A1 | 6/2006 | Ciriza | |
| 2007/0070379 A1 * | 3/2007 | Rai et al. | 358/1.13 |
| 2007/0146772 A1 | 6/2007 | Castellani | |
| 2009/0086237 A1 * | 4/2009 | Hamaguchi | 358/1.13 |
| 2009/0273808 A1 * | 11/2009 | Kohli et al. | 358/1.15 |

* cited by examiner

*Primary Examiner* — King Poon
*Assistant Examiner* — Iriana Cruz
(74) *Attorney, Agent, or Firm* — Gibb & Riley, LLC (57) ABSTRACT

At least two printing devices receive a print job from a user that has printing data and printing specifications. Each of the printing devices calculates an ability score based on each printing device's ability to meet each of the printing specifications. The printing devices each output their ability score to the user. The printing devices then receive an indication as to which printing device is the selected print device, and instructions to print the print job are thus sent from the user to the selected print device. Then, the selected print device prints the print job on tangible media to produce a tangible output.

12 Claims, 3 Drawing Sheets

ECONOMIC MODEL FOR PRINTING WITH A PEER NETWORK OF PRINTING DEVICES

BACKGROUND AND SUMMARY

Embodiments herein generally relate to printing device management systems and more particularly to systems and methods where each of the printing devices calculates an ability score based on each printing device's ability to meet printing specifications and submits such an ability score to the user requesting the print job.

Currently, document devices (e.g., print, scan, fax) are delivered to the office market as individual devices. Some manufacturers have begun selling fleets of devices that are tailored to the needs of particular enterprises, but the devices, once delivered, still operate as independent units. Such fleets would be more productive if they could mutually cooperate and collaborate to provide increased capabilities at reduced costs.

The embodiments presented herein comprise a process for satisfying a set of print requirements through a collaborating set of devices. With embodiments herein, a set of devices (and potentially services such as a central reproduction department (CRD)); each of which is capable of printing a job, can respond to a request to print. In the simplest case, devices predict turnaround time and respond with a bid. The user then chooses the printer that will provide the quickest turnaround.

Using turnaround time assumes that the cost of the employee's time dominates the cost of printing. If this is not the case, the system can use a more complex utility model to take into account the cost and value of various print options, and instead of expected turnaround time each printer can, for example, return their expected utility. Also, the embodiments herein can take into account the reduced value of a black and white document over a color document, the reduced value of poorer image quality of the reduced value of missing finishing capabilities, etc. The embodiments herein also can ensure that the "best" result will be returned first, allowing the user to choose under a guarantee that no better offer will arrive later.

More specifically, stated in terms of a method, in one embodiment herein at least two printing devices receive a print job from a user that has printing data and printing specifications. Each of the printing devices independently calculates an ability score based on each printing device's ability to meet each of the printing specifications. The printing devices each output their ability score to the user. The printing devices then receive an indication as to which printing device is the selected print device, and an instruction to print the print job is thus sent from the user to the selected print device. Then, the selected print device prints the print job on tangible media to produce a tangible output.

The printing specifications can comprise an estimated turnaround time, printing colors, printing quality, print output location, etc. Correspondingly, each of the printing devices calculates the estimated turnaround time as part of the ability score and performs such a calculation based on printing speed and print jobs currently waiting to be printed in each print queue of each of the printing devices. In additional embodiments, the estimated turnaround time is further based on a prediction of print jobs expected to be added to each print queue. Further, when outputting the ability score, each of the printing devices can reserve a place in their print queue for the print job. Alternatively, to provide more of a guarantee that the print job will be completed according to the turnaround estimate, the method can also calculate the ability score based on a worse case estimate.

This method can be applied to an individual printing device. For example, such a printing device could include a processor and a computer storage media operatively connected to the processor (the computer storage media stores instructions executable by the processor). The printing device could also include an interface and a printing engine, both again operatively connected to the processor.

The interface is in communication with the user and other, potentially similar, printing devices. The printing device can be connected to, or associated with, the other printing devices to form a defined group of printing devices to which the user has access. The interface and the other printing devices receive the print job (that again comprises printing data and printing specifications) from the user. In response, each of the printing devices and the processor calculate the ability score (again, based on each printing device's ability to meet each of the printing specifications) and each of the printing devices and the interface output the ability score to the user. If the interface receives the instruction to print the print job from the user, the printing engine prints the print job on tangible media to produce a tangible output.

Other method embodiments relate to systems that are in communication with a print controller that receives the print job from the user. The print controller outputs the print job to a plurality of printing devices. Each of the printing devices calculates the ability score (again based on their ability to meet each of the printing specifications) and outputs the ability score to the print controller.

The print controller displays to the user the abilities of the printing devices to print the print job based on each ability score provided by the different printing devices. In response from the user, the print controller receives an identification of the selected print device. In turn, the print controller instructs the selected print device to print the print job and the selected print device prints the print job on tangible media to produce a tangible output.

A corresponding system has a print controller that receives the print job. The system also includes the plurality of printing devices that are operatively connected to the print controller. The print controller outputs the print job to the printing devices, and each of the printing devices calculates their ability score based on their ability to meet each of the printing specifications. Each of the printing devices outputs their ability score to the print controller and the print controller displays to the user the abilities of the printing devices to print the print job (again based on each of the different ability scores).

The print controller receives, from the user, an identification of the selected print device of the printing devices and the print controller instructs the selected print device to print the print job. Then, the selected print device prints the print job on tangible media to produce a tangible output.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

While the present method and structure will be described in connection with embodiments thereof, it will be understood that this disclosure is not limited to the disclosed embodiments. To the contrary, this disclosure is intended to cover all alternatives, modifications, and equivalents as may be included within the spirit and scope, as defined by the appended claims.

The embodiments herein provide an unexpected market based collaboration between a fleet of multifunction devices (MFDs). In particular, with embodiments herein, each printer (e.g. MFD) independently bids on job based on the printer's calculation of the expected utility to the users. The user selects from the bids returned (e.g., the user may decide to automatically choose the bid with the highest expected utility, or manually choose from a list of bids). If the turnaround time is the primary utility factor, the expected value of the queue length when the job is submitted can be provided as a bid for a job.

The turnaround time may be predicted using queuing theory and the printer may estimate the parameters required by the model from prior statistics. (e.g., a moving window allows for changes in the parameters due to changing job mix or malfunctions). Alternatives to estimating turnaround time include refusing jobs while bids are out, or inserting jobs into a queue to satisfy the bid. In addition, partial satisfaction of requirements may be specified using the utility model (allowing bids that trade off features such a color against turnaround time).

Thus, the embodiments herein create a collaborating fleet of independently acting MFDs. Here the collaboration is through a market inspired interaction which reduces the need for communication between devices, so communication is limited to sharing the method for computing expected utility. The method can be achieved if the printers can communicate with each other to calculate the cost, although embodiments herein can also operate by having each printing device communicate only with the user requesting the print job (where each individual printing device computes their ability score independently, and submits the ability score to the user requesting the printing job independently of all other printing devices).

Others similar approaches have been offered in this area. For example, as shown in U.S. Ser. No. 11/013,322, filed Dec. 15, 2004, U.S. Patent Publication No. 20060132826 by Victor Ciriza (the complete disclosure of which is incorporated herein by reference), entitled "Automated Print Job redirection Modeling and Discovery" describes a system for redirection of prints in a system based on data mining of usage patterns. Since this approach relies on data mining, it requires long run statistics, and is not as good at responding to instantaneous changes in the environment. Also, Ciriza's results can be incorporated into the embodiments herein: the patterns discovered through Ciriza's data mining could aid in the calculation of the cost of printing as required by embodiments herein. For example, the typically used printer might be given additional utility over other printers.

Similarly, U.S. Ser. No. 11/318,745, filed Dec. 27, 2005, U.S. Patent Publication No. 20070146772 (the complete disclosure of which is incorporated herein by reference) by Stephania Castellani entitled "Mechanisms for anonymous decision-making in print job redirections" describes an architecture for negotiation among printers to satisfy a job request. A printer receiving a request for a job can outsource that job or portions of that job to other printers. This model is like a print shop that decides whether to build or buy when presented with a job.

Businesses are working on developing techniques that will allow printer and printing devices to collaborate with each other to solve problems for the user. Since many office class printing machines are members of a fleet, improved abilities of the fleet as a whole over a collection of non-collaborating printing devices promises to be a valuable vector of differentiation.

The problem to be solved, therefore, is to find the best printer for a particular job given that all of the printers within a fleet can potentially communicate with each other. The following use case sketches one way the method/system herein works. First, the user creates specifications of printing requirements using a client software module. The user then chooses from among these specifications from an application the same way he or she would choose a printer. The client software module sends the print specifications and a file in a generic printable language such as PDF, to a network of printing devices. (e.g., MFDs, printers, CRD). The network of devices decides how best to satisfy the requirements and the network of devices. The devices notify the user through the client software module of its choices, possibly allowing the user to override some of the choices. The network of printing devices translates the generic printable language into a language that can be printed by the device it has chosen. The user receives notice of the status of the print job from the network of printing devices through the client software module. The user then picks up the printed print job (output).

The economic model of resource management allocates resources to tasks based the law of supply and demand: as demand for a resource increases, the cost of that resource increases reducing the number of clients who are willing to pay for the resource and reducing the demand. For example, in a grid computing environment where multiple computers offer computing services, each computing node may charge more as the amount of work it has increases; those needing the computing services choose other nodes or delay their request for service based on the cost of those services.

Figure 1:
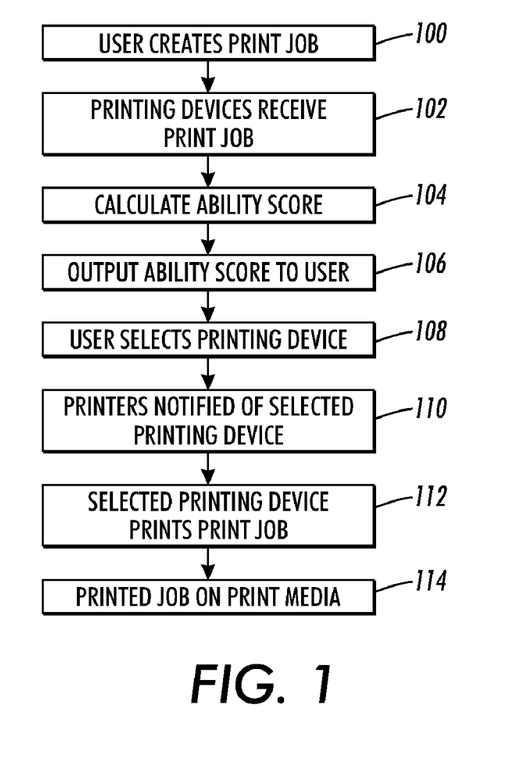
FIG. 1 is a flow diagram illustrating embodiments herein.
Figure 2:
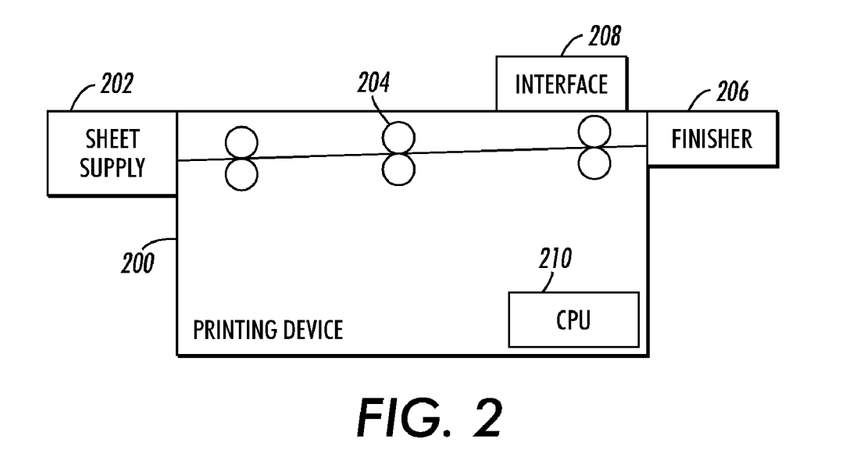
FIG. 2 is a schematic representation of a printing device according to embodiments herein.

The following discussion can be understood by referring to FIGS. 1-2 herein that illustrate the methods/systems herein. For example, in the flowchart illustrated in FIG. 1, in one method embodiment herein the user creates the print job in item 100 and at least two printing devices receive the print job from the user in item 102. This "print job" has printing data and printing specifications. The printing specifications can comprise an estimated turnaround time, printing colors, printing quality, print output location, etc.

In item 104, each of the printing devices calculates an ability score (sometimes referred to herein as a "bid") based on each printing device's ability to meet each of the printing specifications. While, with embodiments herein, each printing device independently calculates an ability score for each proposed print job, each printing device performs the calculation in an identical manner as the other printing devices calculate their own respective ability scores. This occurs with embodiments herein, because each of the printing devices stores instructions that cause each printing device to perform the calculation of the ability score identically. Further, the printing specifications can require specific information be provided in each ability score (e.g., estimated turnaround time, printing colors, printing quality, print output location, etc.) so that the "ability score" is very specific regarding the ability of the printing device to perform the print job. Each of the printing devices can calculate their estimated turnaround time as part of the ability score and can perform such a calculation based on printing speed and print jobs currently waiting to be printed in each print queue of each of the printing devices. In additional embodiments, the estimated turnaround time is further based on a prediction of print jobs expected to be added to each print queue.

The printing devices each output their ability score to the user in item 106. When outputting the ability score, each of the printing devices can reserve a place in their print queue for the print job to help guarantee that a print job will be completed when promised. Alternatively, to also help provide a guarantee that the print job will be completed according to the turnaround estimate, the method can also calculate the ability score based on a worse case estimate.

The user either manually or automatically selects one of the printing devices as a "selected printing device" in item 108. For example, the user can be presented the different ability scores that were returned by each of the printers and can select one of the printers from the list. Alternatively, an automated routine could be established to allow the user to always select the highest scoring printer or select the printer according to other criteria.

Next, in item 110, the user can then notify the printing devices as to which printing device was selected. This notification may notify only the printer whose bid the user accepts, or it may also notify all other printing devices that they were not selected, which allows such non-selected printing devices to adjust any alterations they made to accommodate potential accepted bids. Whether to notify all printers or only the printer whose bid was accepted depends on the method that is used to generate the bids. If the bids are generated solely on predictions of future queue lengths, there is no need to notify printers whose bids are not accepted, because the predictions will be based on statistical information that includes bids generate but not received. On the other hand, if the printer is holding a queue slot for a potential bid, it will need to be notified even if its bid is not accepted, so it can release the held slot. Then, in item 112, the selected print device prints the print job on tangible media to produce a tangible output 114.

This method can be applied to an individual printing device, such as the printing device 200 shown in FIG. 2. The printing device 200 includes a media supply 202 that feeds sheets of media along various marking devices 204 (printing engine) which create markings on the media sheets. A finisher 206 can be utilized to perform operations such as folding, stabling, bookmaking, etc. Such a printing device could include a processor and a computer storage media operatively connected to the processor (the computer storage media stores instructions executable by the processor to perform the methods discussed herein) which are represented by item 210 in FIG. 2. The printing device could also include an interface 208 operatively connected to the processor 210 that could comprise a graphic user interface and/or an interface to a network, telephone connection, Internet connection, etc.

Figure 3:
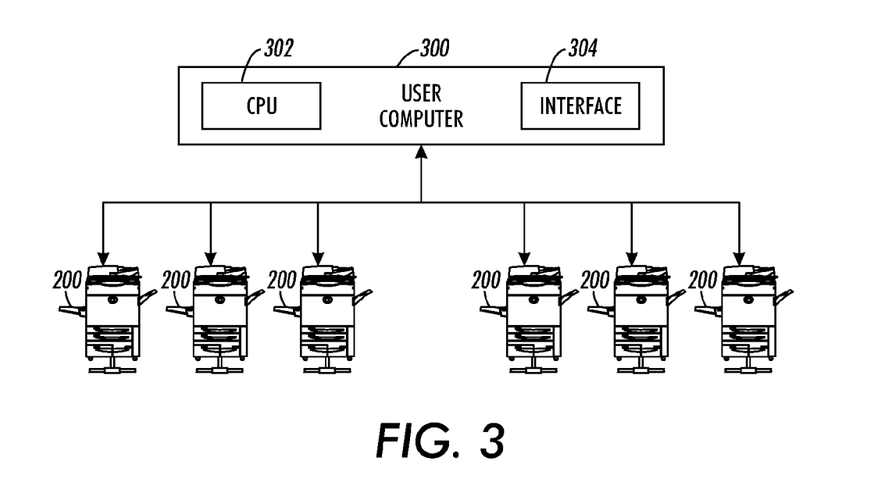
FIG. 3 is a schematic representation of a printing system according to embodiments herein.

FIG. 3 illustrates a fleet of such printing devices 200 in communication with a user computer 300 and potentially in communication with each other. The user computer 300 can comprise, for example, a computerized device such as a personal computer or other device capable of creating a print job that includes a central processing unit (CPU) combined with computerized storage 302 and can include an interface 304 that again can be a network interface, telephone connection, Internet connection, etc. as well as a graphic user interface through which the a human can interact. The display of the bids or ability scores of the different printers can be displayed for the user to review on the interface 304 through a software program, cookie, macro, print driver, etc. stored and executing on the processor 302. This program, cookie, macro, etc. can be temporarily or permanently stored on the processor's memory.

The interface 208 of each of the printing devices 200 can be in communication with the user computer 300 and can also be in communication with the other, potentially similar or potentially different, printing devices 200. The printing devices 200 can be connected to form a defined group of printing devices to which the user 300 has access. The interfaces 208 of the printing devices 200 receive the print job (that again comprises printing data and printing specifications) from the user 300. In response, each of the printing devices calculate (using each processor 210) the ability score (again, based on each printing device's ability to meet each of the printing specifications) and each of the printing devices (using the interface 208) output the ability score to the user 300. If a given interface 208 receives the instruction to print the print job from the user, the corresponding printing engine 204 prints the print job on tangible media to produce a tangible output.

Figure 4:
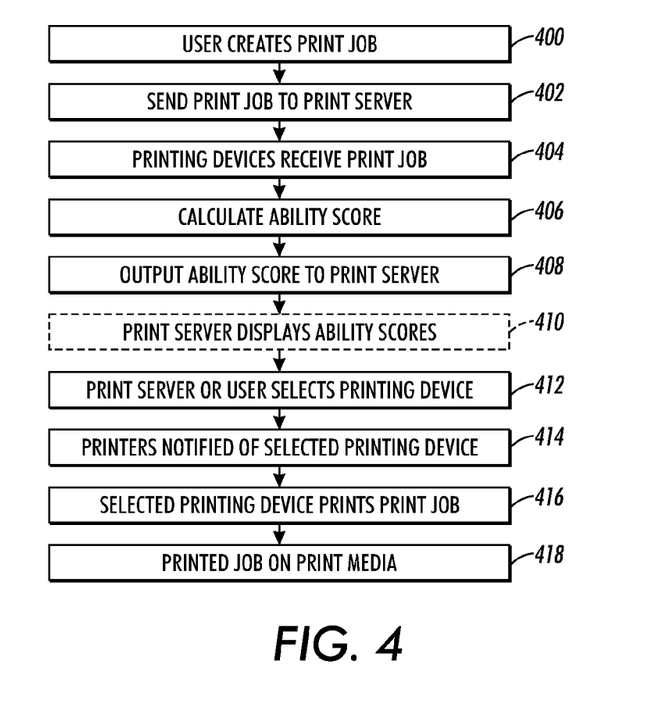
FIG. 4 is a flow diagram illustrating embodiments herein.

As shown in flowchart form in FIG. 4, other method embodiments relate to systems that are in communication with a print controller that receives the print job from the user. Thus, as shown in FIG. 4, the user creates the print job in item 400 (which again includes the printing specifications mentioned above) and sends the print job to the print server or print controller in item 402. The print controller/server outputs the print job to a plurality of printing devices in item 404. Each of the printing devices calculates the ability score (again based on their ability to meet each of the printing specifications) in item 406 and each of the printing devices outputs the ability score to the print controller/server in item 408.

The print controller/server optionally displays or outputs to the user the abilities of the printing devices to print the print job based on each ability score provided by the different printing devices in item 410. In response from the user, the print controller receives an identification of the selected print device from the user. As discussed above, the choice of the selected printing device can be a manual or automatic selection by the user. Step 410 is optional because in step 412, the print server could potentially automatically select the printer device on behalf of the user. Therefore, in some embodiments herein, the choice of which printer to utilize is completely transparent to the user. Therefore, if the print controller/server makes the selection automatically for the user, the user can be simply notified as to which selection was made. In turn, the print controller/server notifies the printers as to which printer is the selected printing device in step 414. In item 416, the selected print device prints the print job on tangible media to produce a tangible output 418.

Figure 5:
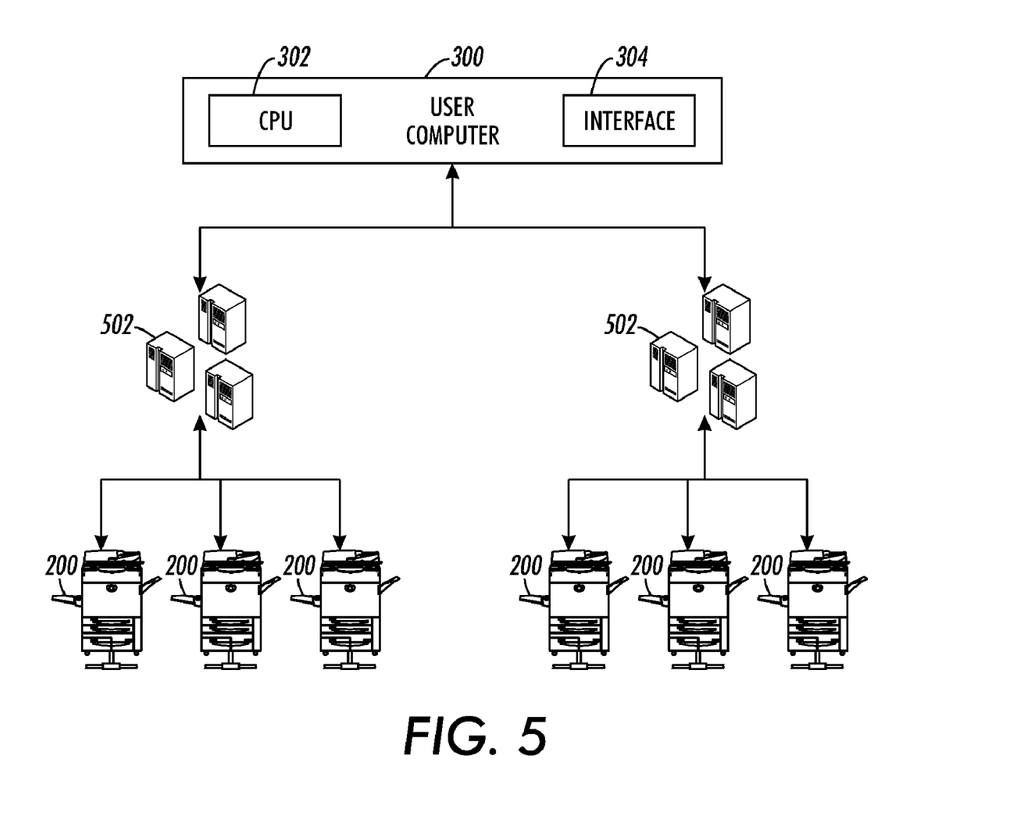
FIG. 5 is a schematic diagram of a system according to embodiments herein.

A corresponding system that has one or more print controllers/servers 502 that receives the print job from the user 300 is shown in FIG. 5. The system also includes the plurality of printing devices 200 that are operatively connected to a corresponding print controller/server 502. The print controller/server 502 outputs the print job to the printing devices 200, and each of the printing devices 200 calculates their ability score based on their ability to meet each of the printing specifications. Each of the printing devices 200 outputs their ability score to the print controller/server 502 and the print controller/server 502 displays (outputs) to the user 300 the abilities of the printing devices 200 to print the print job (again based on each of the different ability scores).

The print controller/server 502 receives, from the user 300, an identification of the selected print device and the print controller/server 502 instructs the selected print device to print the print job. Then, the selected print device prints the print job on tangible media to produce a tangible output.

In an office environment where there are multiple printers with different characteristics (scattered across the enterprise used by multiple people, also scattered across the enterprise who have different requirements, some unspoken, across each of their jobs) calculation of utility is complicated. The following discussion considers first the problem of computing turnaround time for the printer. Next the discussion considers the problem of dealing with requirements that are not specified when the job is bid. Third, the discussion explores the problem of decision making from the user's point of view and providing guarantees on the information the user has when the decision is required.

As mentioned above in items 104 and 404 each individual printing device calculates its own ability score (bid) based on the print characteristics of the print job created by the user. One aspect of the ability score is the turnaround time of the print job. When calculating the turnaround time, first the embodiments herein consider turnaround time purely from the point of view of the machine. Here, the device looks at its queue length, its print speed in pages per unit of time, and the length of the job to be printed. It then computes the length of time it will take to complete the job by multiplying the queue length in pages by its print speed and adding the length of the job in pages by its print speed. In the simplest case, this length of time is the bid this device will return to the user. In many cases, this simple calculation will suffice.

Formula (1) shows an example calculation for the turnaround time $TAT_{c,p}$ for a new job c on printer p. Here, $s_i$ is the startup time for job i already in the printer's queue; $l_i$ is the number of pages of job i, $\mu_p$ is the page rate of the printer p, and $l_c$ is the length of the current job c in number of pages. The parameter $\mu_p$ can either be entered from the printer's manufacture tag, or can be estimated from statistics.

$$TAT_{c,p} = \sum_{i=1}^{n} (s_i + l_i/\mu_p) + l_c/\mu_p \qquad (1)$$

Then the customer can select the bid with the minimal cost, for example here it is the shortest $TAT_{c,p}$. The advantage of this approach is that, if it can be assumed that the time required to complete a job is the only factor in the user's decision, it constantly balances the load on any all printers capable of printing a job. As the queue length on any one printer increases, the cost for the next bid increases, which reduces the chance that the printer will be chosen for the next job. If it is not chosen, its queue length will decreases, while the queues of other printers will increase until its queue is not longer than the longest at which point it will be chosen again. The system insures that the queues remain balanced at all times. If there are other factors that go into the user's selection of a printer such as nearness, the system will not balance the queue lengths, but will instead optimize the use of the printers to the user's requirements.

Formula (1) computes the current turn around time, but it will take time for the bid to be returned to the user and for the user to evaluate and accept the bid. During this time additional jobs may arrive increasing the queue size and changing the bid. In the embodiment shown in FIG. 3, the fleet of printing devices 200 does not have a central server to handle print requests and the job assignment to printers and, therefore, individual printers make decisions based on their ability scores. In this case, there are four possible responses: 1) The machine can overbid (i.e., adjust the bid to reflect expected changes during the expected time the user will require to reply) allowing for variation in the queue length; 2) the machine can refuse to accept new items in its queue while a bid is out; 3) the machine can accept new jobs, but insert the job in the queue where it would have been if the bid were accepted instantaneously; or 4) the machine can return with an additional bid if the queue length increases. Each of these options has different features.

The printing device that is programmed to overbid should estimate the real length of time as closely as possible. If it is too long, the user may not choose the bidding printer when it is actually the optimal one. If it is too short, the user may choose the bidding printer when it is not the optimal one. The best estimate of the change in the queue length over time is a function of the expected value of the queue length over time. Such a function can be easily computed from prior (historical) data.

In the simplest case, calculating the turnaround time will simply add the expected increase in the length of the queue. The queue can be modeled using queuing theory. The simplest example is as an M/M/1 queue which suffices in most cases. In cases with more unusual queuing behavior one could use a G/G/1 model determining the distribution by regression. The following example assumes an M/M/1 model for printer p with the current page arrival rate $\lambda_p$ and the mean page process rate $\mu_p$. From these parameters the embodiments herein can calculate the expected turnaround time by $$E(TAT)_{c,p} = \sum_{i=1}^{n} s_i + \frac{\sum_{i=1}^{n} l_i + l_c + (\mu_p - \lambda_p)t}{\mu_p} \qquad (2)$$

$$= TAT_{c,p} + \frac{(\mu_p - \lambda_p)t}{\mu_p}$$

The parameter $\lambda_p$ can be obtained by using a sliding window of x hours to record the average page arrival rate within the recent x hours. The size of the sliding window x can be determined by experiments. Heuristically, large-size window has a better estimation of the real arrival rate, but a smaller-size window can respond more quickly to real-time changes of page arrival. More sophisticated models are possible. For example, one can calculate the probability that the queue length will suddenly increase by looking at the variability of the queue length. One can also provide more sophisticated models that take seasonality or other parameters into account. For example, the prints queues could jump up at 5:00 PM. Regression analyses should provide insights into the probability of these parameters having significant effects.

Formula 2 is amount of time it will take to complete the current queue plus the expected time to process jobs that arrive over time t, during which the user is deciding whether or not to accept the bid. If the Generalized Print Drive is able to display changing values, it can compute and display the changing expectation as time progresses. A simpler system may choose an expected wait time and provide a simple bid by plugging in the expected wait time for t. Here, the print driver will display a fixed number rather than a number that changes as the user waits.

As an alternative to the best estimate, the printer can provide a pessimistic estimate that it can guarantee. To do this, it assumes that all bids it offers will be accepted keeping a virtual queue of bid jobs. This queue will be longer or equal to the true queue, so it will never underestimate a job. It may, however grossly overestimate a job. The over estimate will depend on the number of rejected bids. This strategy may be preferable if there are few bids for any one jobs; it is likely to grossly overestimate if the number of bids greatly exceeds the number of jobs. To calculate the worst turnaround time WTAT, simply calculate a sum of all of the processing times, $bt_j$, currently out for bid: i.e. for the $j^{th}$ bid $bt_j=l_j/\mu_p+s_j$, and add the time required to process the jobs already in the queue, with the formula $$WTAT = \left(\sum_{j=1}^{M} btj\right) + \sum_{i=1}^{n} (s_i + l_i/\mu_p) \quad (3)$$

An alternative to attempting to predict the future state of the queue is to manage its length. The printer can do this simply by refusing to accept jobs when a bid is out. This however, requires a timely response to the bid if the printers are not to stand idle waiting for a bid to return while others have jobs to be printed. This approach is unlikely to be useful when humans need to accept bids as they may fail to choose in a timely fashion or may forget to respond in the negative to all the printers whose bids they have rejected. The expected value of freezing the queue can be calculated by subtracting the expected cost of quick and accurate prediction of queue length from the expected cost of computing the length. Since computation is fast relative to printing, queue freezing may be valuable in settings where the acceptance of bids is automated, as is a possibility in both embodiments shown in FIGS. 3 and 5.

Another alternative to predicting the future state is to honor all bids despite the subsequent activity. This option is similar to overbooking as described by Castelani, but overbooking does not reserve slots, as this embodiment does. The printer can insert the job whose bid is accepted into the queue as it was when the bid was offered. To bid jobs when other bids are out, it will still need to either predict the number of bids that will come in or provide a pessimistic estimate. This alternative may be useful when there are multiple routes into the printing queue, some of which do not require bids. The printer can guarantee the bids it makes and manipulate the queue of non-bid jobs that arrive. For example, if copy or fax jobs are possible, the machine could insert accepted jobs into the stream as they were bid, interrupting or delaying the fax or copy jobs. Delaying copy jobs may be problematic under the reasonable assumption that the copy user is standing at the machine.

The present embodiments also deal with unspoken requirements. The above printing characteristics (parameters) of a print job are complex and may not be anticipated by the printer manufacturer. For example, someone may usually prefer their jobs to be delivered to their office—e.g., either by themselves picking up the job at the printer or by the CRD sending someone with the job. If, however, they plan to deliver a printout to someone else in another building, they may, for this job, prefer that the job be delivered to a location in the other building. As another example, a person may have a color presentation that they would prefer to be printed in black and white, to see if it is legible when not printed in color; whereas in another case they may need it printed in color and in yet another they care only that it be printed as fast as possible. Providing the capability to specify all these parameters is difficult and it is even more difficult for the user to do the specification. A better system is to allow vague a specification that can be tightened later.

To do this in a printing environment, the embodiments herein can respond with bids and a detailed specification of how the results will look, when they will be delivered and where they will be delivered. The user can then choose among the list of responses for the one that best fits his or her actual requirements. The present embodiments allow the user to balance the cost imposed by the turnaround time against the different value they place on the requirements they specify. Here, the queue length may not balance. Variability in the queue length will indicate the different value placed on features other than turnaround time.

With respect to dealing with the cost of information in decision making, to make a decision, the user will require accurate information in the face of change. As the queue length of the printers change, the longer the user waits, the less accurate the estimate is likely to be. By delaying the bids by the inverse of the estimated turnaround time, the system can guarantee to the user that no shorter bids will arrive if his or she waits longer.

In the simplest case, it can be assumed that wait time is the only factor in determining the value of the bid to the user. In this case, the value of the bid is directly proportional to the length of time it will take to print the job. Formula (4) shows the calculation for the delay $d_{c,p}$ for the new job c on printer p. The constant k designates the proportion of the turnaround time to the delay. This constant is chosen so that variations in the delay introduced by communication between the printer and the user will not reorder the bids.

$$d_{c,p} = \frac{TAT_{c,p}}{k} \quad (4)$$

More complicated formulae are possible. For example, one could use formula (2) to calculate $d_{c,p}$.

The length of the queue could change dramatically during the delay the user requires to respond to a bid. If the time required to print the file is the same or less that the time anticipated in the report, the printer may print the file. If the time has increased, perhaps through new jobs entering the queue or because of a failure of the printer, the printer may send an updated report. (Whether or not to send an updated report can be part of the job parameters.)

After sending an updated report, the printer can do one of two things. First, the printer may place the file in the queue and print it when it comes up unless it is cancelled. Secondly, the printer may hold the file and wait for a response to the updated report.

If the printer holds the file waiting for an addition response, there is a possibility that the situation will change again before it gets the response, so it must have a policy that does not allow for an infinite wait before printing. There are at least three such policies. First, the printer can place the file in the queue regardless of changes after a certain number returned responses; secondly, the printer can freeze the queue, accepting no more jobs, after a certain number of responses; and thirdly, the printer can reject the job after a certain number of responses. If the printer receives a notice that the requestor does not want the file printed, the printer removes the report from its list of reports.

The following sets forth a non-limiting example of how the embodiments herein could be implemented. One ordinarily skilled in the art would understand that the following is only an example, and does not limit the implementations of embodiments herein. In this example, a set of printers receives a request containing requirements for a job and summary statistics on the data to be sent. (Summary statistics, such as the estimated number of pages, are sent to avoid sending the file to be printed since it will probably be printed on only one printer.) Each printer in the set need not be capable of satisfying all of the requirements of the request.

In this example, each of the printers receiving the request calculates the time it will take to complete the job. The printer prepares a report on the requirements that it can satisfy and the location at which the prints will be delivered. Therefore, if the printer is a hallway printer or MFD, it would report its location; if it is a Central Reproduction Department (CRD) it may report the location of the CRD, or if the CRD offers delivery, it may report the requestor's office. The printer waits for a time proportional to the time it will take to complete the job, then sends the report to the requester along with a unique identifier. The printer also stores a copy of the report indexed by the unique identifier of the request. If the wait time is unknown (the print capability may be disabled), the device responds immediately with information that it cannot satisfy the request.

The requestor's client will display a list of printers associated with the time it will take to satisfy the request, the location of the printer, and any requirements that printer cannot fulfill. The printers that cannot satisfy the request at all will return immediately; the ones that can complete most quickly will arrive next.

The requester decides whether to a send the file to be printed to the one that can supply the print fastest or to wait until other printers return. For example, a black and white printer may return first for a color job. If color is less important that getting the document quickly, the requester may choose that printer. Alternatively, it may take longer to walk to the first printer that returns than it would to choose a slower printer. When the requester chooses a printer or printers for the job, the requestor's client sends notices to all the printers that received initial requests. Those printers that have been chosen to print the job receive a request to print the job along with the unique identifier from the report; those that are not chosen can be notified that they need not print the job.

The printer that receives the request to print the job checks the report that was sent to the requester and determines whether anything has changed since it sent the report and the current time. If the print capability has failed since the bid was sent, the printer sends a report to the user, holds the file and waits for a response to the updated report. Otherwise, it places the file and associated requirement at the end of the queue.

Many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

The word printer, printing device, etc. as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein should not be implied or imported from any above example as limitations to any particular order, number, position, size, shape, angle, color, or material.

What is claimed is:

1. A method comprising:

receiving, by a plurality of printing devices, a print job comprising printing data and printing specifications from a user;

calculating, independently by each of said printing devices, an ability score based on an ability to meet each of said printing specifications, said printing specifications comprising an estimated turnaround time, and said calculating of said ability score comprising each of said printing devices calculating said estimated turnaround time as part of said ability score based on printing speed and print jobs currently waiting to be printed in each print queue of each of said printing devices, and said calculating of said estimated turnaround time being further based on a prediction of print jobs expected to be added to each said print queue;

outputting said ability score independently from each of said printing devices to said user;

receiving, by a selected print device of said printing devices, an instruction to print said print job from said user; and printing, by said selected print device, said print job on tangible media to produce a tangible output.

2. The method according to claim 1, said outputting of said ability score further comprising reserving, by each of said printing devices, a place in each print queue of each of said printing devices for said print job.

3. The method according to claim 1, said ability score comprising a worse case estimate.

4. A method comprising:

receiving, by a print controller, a print job comprising printing data and printing specifications from a user, said printing specifications comprising an estimated turnaround time, printing colors, printing quality, and print output location;

outputting said print job from said print controller to a plurality of printing devices;

calculating, independently by each of said printing devices, an ability score based on an ability to meet each of said printing specifications, said printing specifications comprising an estimated turnaround time, and said calculating of said ability score comprising each of said printing devices calculating said estimated turnaround time as part of said ability score based on printing speed and print jobs currently waiting to be printed in each print queue of each of said printing devices, and said calculating of said estimated turnaround time being further based on a prediction of print jobs expected to be added to each said print queue;

outputting said ability score independently from each of said printing devices to said print controller;

displaying abilities of said printing devices, based on each said ability score, to print said print job from said print controller to said user;

receiving, by said print controller, an identification of a selected print device of said printing devices from said user;

instructing, by said print controller, said selected print device to print said print job; and printing, by said selected print device, said print job on tangible media to produce a tangible output.

5. The method according to claim 4, said outputting of said ability score further comprising reserving, by each of said printing devices, a place in each print queue of each of said printing devices for said print job.

6. The method according to claim 4, said ability score comprising a worse case estimate.

7. A printing device comprising:

a processor;

a computer storage media operatively connected to said processor, said computer storage media storing instructions executable by said processor;

an interface operatively connected to said processor, said interface being in communication with a user and a plurality of printing devices, said interface and said plurality of printing devices receiving a print job comprising printing data and printing specifications from said user, each of said printing devices independently and said processor calculating an ability score based on an ability to meet each of said printing specifications, said printing specifications comprising an estimated turnaround time, and said calculating of said ability score comprising each of said printing devices calculating said estimated turnaround time as part of said ability score based on printing speed and print jobs currently waiting to be printed in each print queue of each of said printing devices, and said calculating of said estimated turnaround time being further based on a prediction of print jobs expected to be added to each said print queue, and each of said printing devices independently and said interface outputting said ability score to said user; and a printing engine operatively connected to said processor, if said interface receives, from said user, an instruction to print said print job, said printing engine printing said print job on tangible media to produce a tangible output.

8. The device according to claim 7, said outputting of said ability score further comprising reserving, by each of said printing devices, a place in each print queue of each of said printing devices for said print job.

9. The device according to claim 7, said ability score comprising a worse case estimate.

10. A system comprising:

a print controller receiving a print job comprising printing data and printing specifications from a user, said printing specifications comprising an estimated turnaround time, printing colors, printing quality, and print output location; and a plurality of independent printing devices operatively connected to said print controller, said print controller outputting said print job to said printing devices, each of said printing devices independently calculating an ability score based on an ability to meet each of said printing specifications, said printing specifications comprising an estimated turnaround time, and said calculating of said ability score comprising each of said printing devices calculating said estimated turnaround time as part of said ability score based on printing speed and print jobs currently waiting to be printed in each print queue of each of said printing devices, and said calculating of said estimated turnaround time being further based on a prediction of print jobs expected to be added to each said print queue, each of said printing devices independently outputting said ability score to said print controller, said print controller displaying, to said user, abilities of said printing devices to print said print job, based on each said ability score, said print controller receiving, from said user, an identification of a selected print device of said printing devices, said print controller instructing said selected print device to print said print job, and said selected print device printing said print job on tangible media to produce a tangible output.

11. The system according to claim 10, said outputting of said ability score further comprising reserving, by each of said printing devices, a place in each print queue of each of said printing devices for said print job.

12. The system according to claim 10, said ability score comprising a worse case estimate.

* * * * *